July 31, 1962 M. R. PIERCE ET AL 3,046,830
OPTICAL NAVIGATIONAL DEVICE
Filed June 17, 1958 8 Sheets-Sheet 1

INVENTORS
MAURICE R. PIERCE AND
JAMES S. FASSERO
BY
Gerald H. Peterson
ATTORNEY

INVENTORS
MAURICE R. PIERCE AND
JAMES S. FASSERO
BY
Gerald H. Peterson
·ATTORNEY·

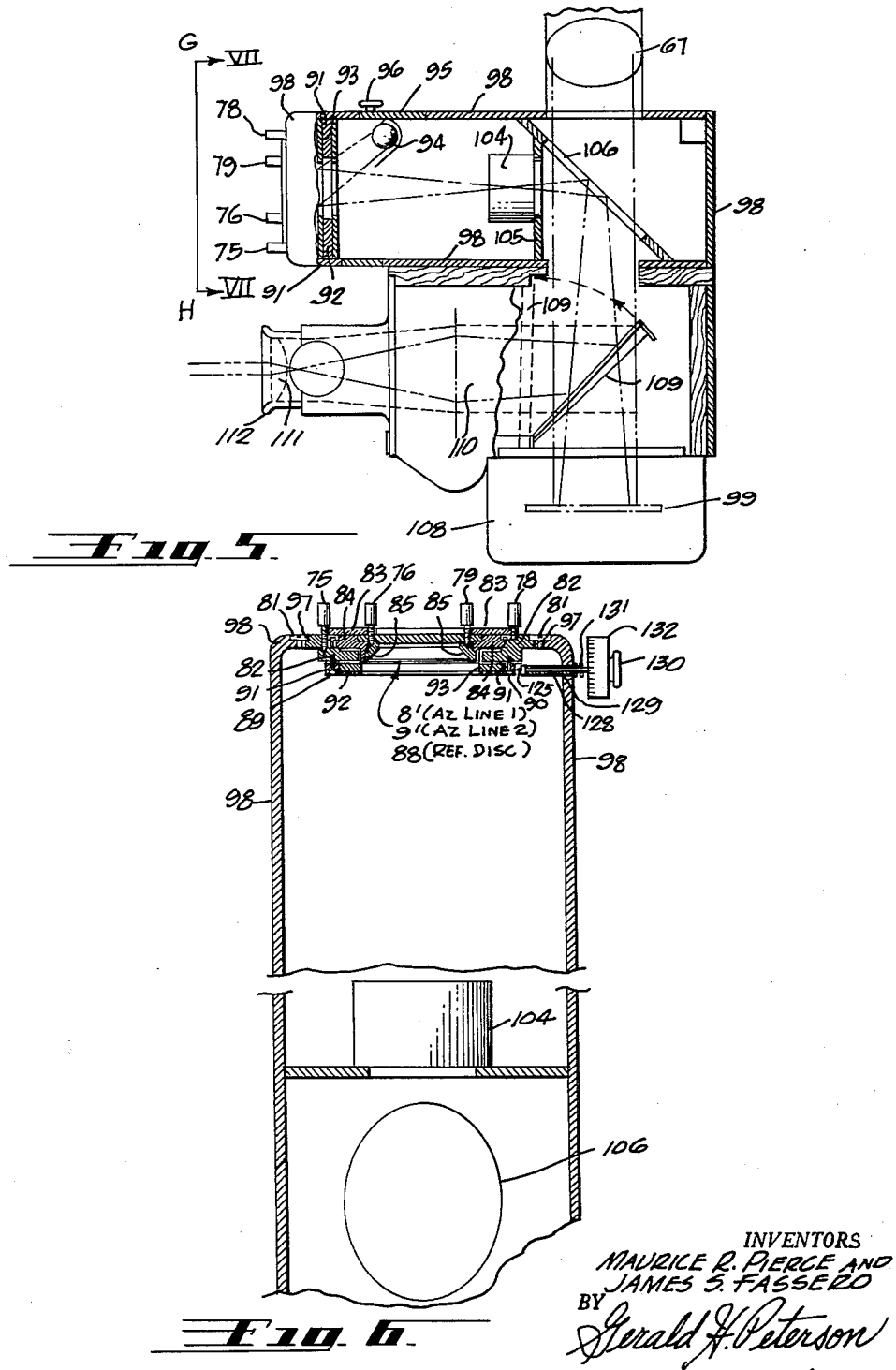

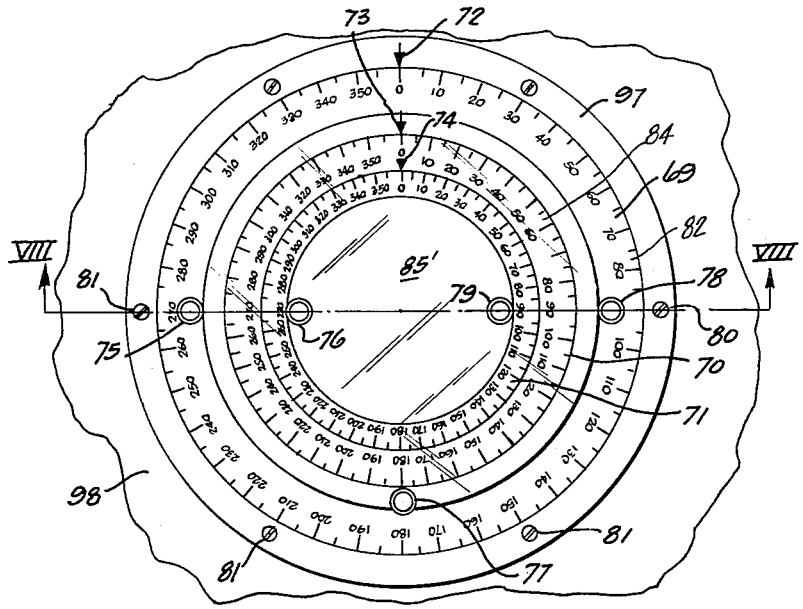
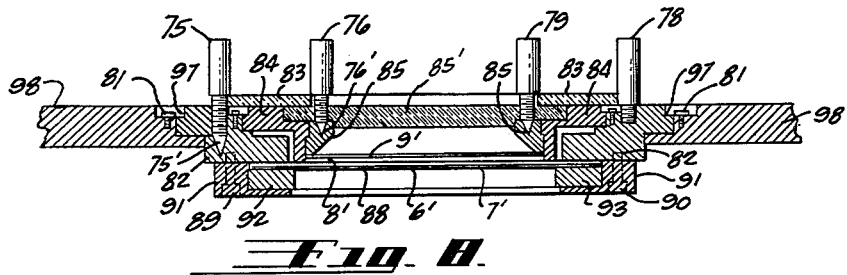

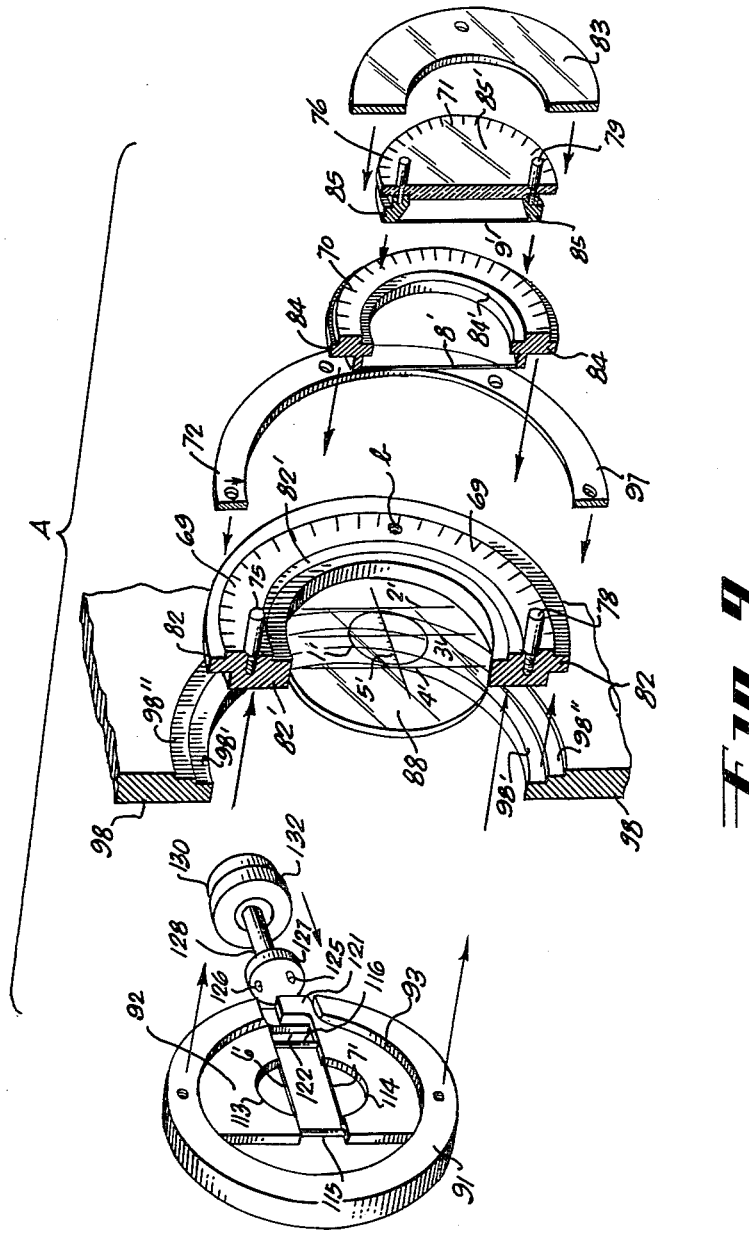

July 31, 1962 M. R. PIERCE ET AL 3,046,830
OPTICAL NAVIGATIONAL DEVICE
Filed June 17, 1958 8 Sheets-Sheet 7

INVENTORS
MAURICE R. PIERCE AND
JAMES S. FASSERO
BY
Gerald H. Peterson
- ATTORNEY -

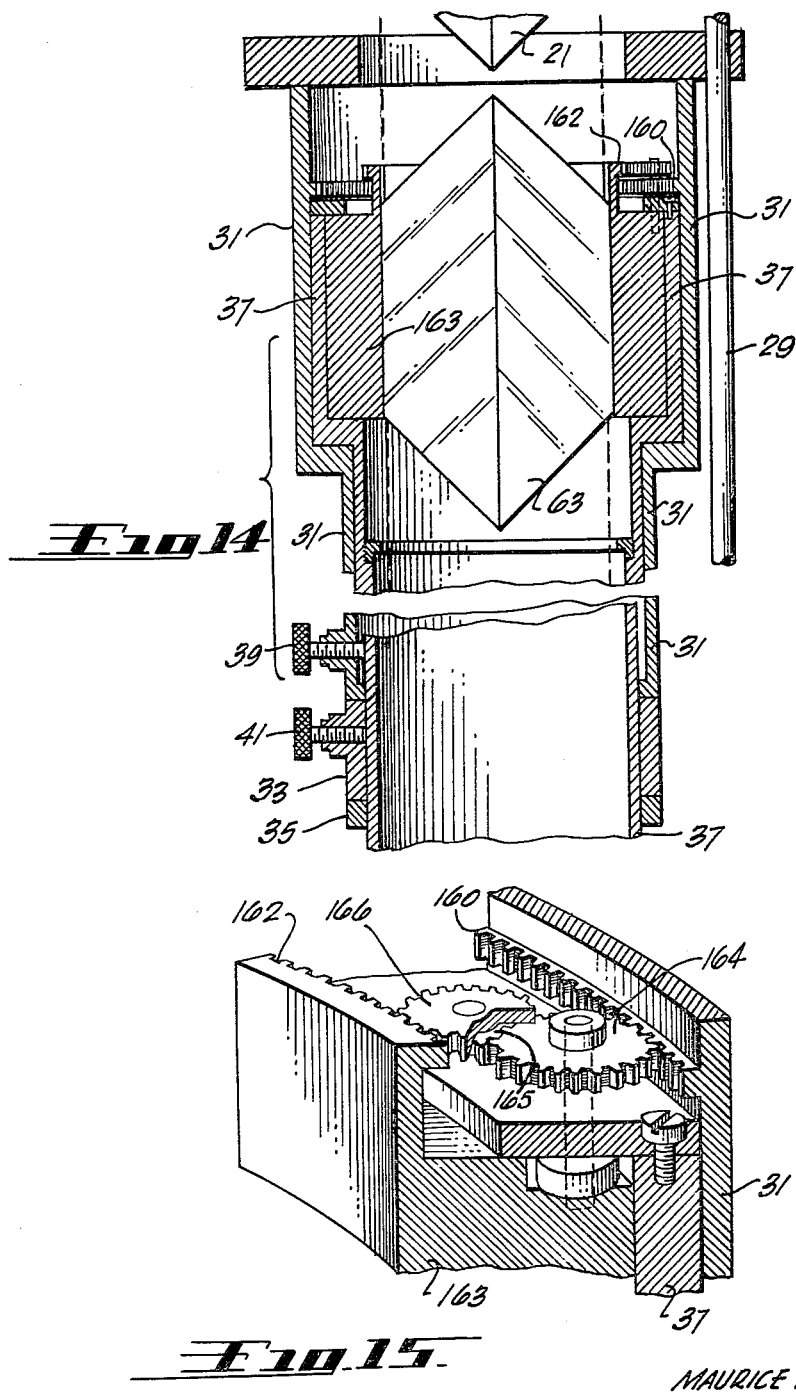

United States Patent Office 3,046,830
Patented July 31, 1962

3,046,830
OPTICAL NAVIGATIONAL DEVICE
Maurice R. Pierce, 6400 Primrose Ave., Los Angeles, Calif., and James S. Fassero, 4622 Loleta Ave., Eagle Rock, Calif.
Filed June 17, 1958, Ser. No. 742,535
18 Claims. (Cl. 88—2.7)

This invention relates to an optical device useful in celestial navigation which provides, in a composite image, the images of two celestial bodies along with an image of the reference markings, used in obtaining a "fix" of position from the intersection of two lines of position derived from observation on and computations for two celestial bodies, as plotted on a Universal Plotting Sheet.

As well known in celestial navigation, a "fix" point of position is obtained from the intersection of two lines of position as plotted on a Universal Plotting Sheet, published by the Hydrographic Office, in accordance with data obtained by computing the altitudes for two stars for an assumed position and observing the actual altitudes of two stars with a sextant, including a correction arising when the two observations are not simultaneous.

Although the Universal Plotting Sheet does not form a part of the invention, it is believed that the invention will be more easily understood by first briefly describing the known use of such a plotting sheet in obtaining a "fix" in connection with FIG. 1 of the drawings.

FIG. 1 shows a plot of a "fix" with two azimuth lines 8 and 9 and two lines of position 12 and 13 hand plotted on a Universal Plotting Sheet derived from azimuth and altitude observations on two stars by means of a sextant and from computations of their altitudes for an assumed position. The Universal Plotting Sheet contains the basic reference markings for the assumed position, particularly including longitude line 5 and latitude line 3 which intersect at 15, representing the assumed position, and an azimuth circle with radius of one degree of latitude marked in degrees from 0° to 360°. For convenience longitude line 5 is usually marked off in minutes. Longitude line 5 extends north and south as on a map and latitude line 3 east and west. On the azimuth circle 0° is north, 90° east, 180° south, and 270° west. Latitude lines 2 and 4 at the top and bottom of the circle are included for convenience. It will be understood that longitude line 5, latitude line 3 and azimuth circle 1 constitute the basic reference markings for the assumed position. In the illustration shown in FIG. 1 the assumed position is latitude 50° north and longitude 120° west.

In accordance with celestial navigation procedure, observations are made on the two stars to obtain azimuth direction and altitude of each, and, when the time difference between the two observations is significant, a correction is made for the time difference so that the two values for the observations are those made simultaneously. The altitude of each of the two stars is computed for the assumed position and the difference between the computed and observed altitude obtained for each.

In hand plotting the "fix" two azimuth lines are drawn through the center 15 of the reference circle 1 to the circumference of the circle through the azimuth markings which correspond to the azimuth angle of the two stars chosen for observation. Thus, line 8 on FIG. 1 is the azimuth line drawn for a star having an azimuth angle of 120°, and line 9 is an azimuth line drawn for the second star having an azimuth angle of 220°. The altitude difference between the computed and observed altitude of each of the two stars, corrected to simultaneous observation, is marked off on the respective azimuth line at a distance measured in minutes from the center 15. The mark is made either in the direction of the star azimuth or in the opposite direction depending on whether the algebraic difference between the computed altitude and observed altitude is positive or negative that is, depending on whether the observed altitude is low or high compared to the computed altitude. In the example shown in FIG. 1, point 10 represents a negative difference of 18 minutes on the star whose azimuth is 120°, that is, the assumed altitude is 18 minutes too high, and point 11 represents a positive difference of 30 minutes on the star whose azimuth is 220°, that is, the assumed altitude is 30 minutes too low. Longitude line 6 is drawn parallel to line 5 through the degree markings on azimuth circle 1 spaced 50° from the 90° mark corresponding to latitude 50° N., for the assumed position, that is, through the 40° and 140° markings, and longitude line 7 is drawn through the 220° and 320° markings. This gives the proper spacing between the longitude lines for the latitude of the assumed position.

Through each of the points 10 and 11 lines of position 12 and 13 are drawn perpendicular to the appropriate azimuth lines 8 and 9, respectively, and the intersection 14 of the two lines of position is the "fix" of position. In the example of FIG. 1 the "fix" shows the position to be latitude 50°4' north, longitude 120°46' west.

The two longitude lines 6 and 7 are drawn in for the purpose of readily reading off the longitude of fix 14. The spacing of each of the two longitude lines 6 and 7 from longitude line 5 will vary from zero at the poles to one degree at the equator. The distance from longitude line 5 to each of the longitude lines 6 and 7 represents 60 minutes of longitude at the latitude of the assumed position. Hence, with these two lines 6 and 7 drawn in, the minutes from longitude line 6, if the fix is located between lines 6 and 5, or from line 5, if it is located between lines 5 and 7, can be readily obtained.

Usually it is not possible to obtain simultaneous altitude observations on the two stars. Corrections must then be made for the time difference between the two observations and this is undesirably time-consuming. Moreover, in high-speed aircraft with a lone pilot, it is not only desirable to obtain simultaneous observations on the two stars, but also to obtain as much of the entire plot for the fix as possible as rapidly as possible.

In accordance with the invention not only are the observations of the two stars made simultaneously, but also the images of the two celestial bodies are included in the composite image to provide directly the two points, such as 10 and 11, in their desired location in the composite image as plotted on a Universal Plotting Sheet for locating the two lines of position and this is obtained without having to observe the altitudes with a sextant, without having to make a correction for lack of simultaneity of the observations, without subtracting to get the difference between the computed and observed altitudes, and without plotting the points such as 10 and 11 from a calculation of the difference between such observed altitude and the altitude computed for the assumed position. Moreover, in accordance with the preferred arrangement of the invention, as much of the entire data as possible is provided in the composite image along with the images of the two stars, excepting only the two lines of position themselves, so that the fix can be quickly determined by simply drawing only the lines of position through the star images perpendicular to their respective azimuth lines.

Before describing the invention itself, it is believed that it will be more readily understood by a preliminary brief description of such a composite image obtained in accordance with the preferred arrangement of the invention as shown in FIG. 2, where all the data except the lines of position are obtained in the composite image provided by the optical system.

FIG. 2 shows such a composite image produced in accordance with our invention under the same circumstances which were assumed for the hand plot in the example of FIG. 1. The composite image contains a reference circle 1″; latitude lines 2″, 3″, and 4″; longitude lines 5″, 6″, and 7″; and star azimuth lines 8″ and 9″. Also included in the same composite image are the images of the two stars 10″ and 11″ spaced from the center 15″ a distance corresponding to the difference between the computed altitude and the actual altitude and oriented in proper azimuth. These numerals with the double-prime correspond to the elements in FIG. 1 having the same numbers.

In accordance with our invention we have devised an optical device or camera which will provide a composite real optical image, such as shown in FIG. 2, which can be viewed with an eye-piece or photographed. Means are included to produce an image of the basic reference markings for an assumed position, essentially including a latitude line and longitude line intersecting at a point representing the assumed position, an azimuth circle with markings indicating compass directions, such as appear on a Universal Plotting Sheet, images of two independently adjustable azimuth lines, and the two star images on their respectve azimuth line images at a distance from the assumed position in the image corresponding to the difference between their computed and observed altitudes. Preferably, where it is desired to obtain as much of the usual plot for a fix as possible, means will also be provided for including images of the two longitude lines in the composite image adjustable in accordance with the latitude of the assumed position. If desired, means may also be provided for including an image of a clock indicating the time that observations are made and also means providing an image of levels indicating the level of the device. Means are also provided for viewing or photographing this composite image.

Accordingly, it is an object of my invention to provide such an optical device which will quickly give a composite image of the necessary information for a plot of a fix for two celestial bodies, including images of the two celestial bodies on images of their azimuth lines in the composite image which are so related to the image of the reference markings that a fix can be obtained directly from the composite image simply by drawing in the two lines of position through the star images and perpendicular to the respective azimuth lines to obtain their intersection as the fix.

It is a further object of the invention to provide such a device which will give such a composite image containing all necessary information for a plot of a fix of position from observations on two celestial bodies such as usually plotted on a Universal Plotting Sheet, excepting only the lines of position, which can readily be drawn in the image to obtain the fix.

Other and further important objects and advantages of my invention will be apparent to those skilled in the art from the following description and accompanying drawings.

In accordance with the one preferred embodiment of my invention generally described, there is provided a combination of two optical means for providing the composite image, as referred to above. The first optical means introduces three images into the composite image; namely, (1) an image of the basic reference markings of an assumed position for plotting a line of position, including the longitude and latitude lines intersecting at the point of the assumed position and the azimuth circle with azimuth markings such as appears on a printed Universal Plotting Sheet as published by the Hydrographic Office, (2) images of the two azimuth lines, and (3) images of the two adjustable longitude lines. The image (1) of the basic reference markings is rotatable in the plane of the composite image about the image of the point of the assumed position, that is, the intersection 15″ of lines 5″ and 3″. The two azimuth line images (2) pass through this point, and are also independently rotatable in the plane of the composite image about this point. The two longitude line images (3) rotate with the image of the basic reference markings so that they are always parallel with the image of longitude line of the assumed position. These two longitude line images are adjustable in their spacing from the image of the longitude line for the assumed position in accordance with the latitude of the assumed position. This first optical means comprises optical sources for these three images and a lens and mirror system for producing a real image of these optical sources in the focal plane of the real composite image.

The second optical means simultaneously introduces the images of the two celestial bodies into the composite image, at azimuth positions in the composite image corresponding to their actual azimuths, and is so related to the first optical means that the images of each celestial body falls on its respective azimuth line image at a distance from the point of the assumed position, which, as on a plot on a Universal Plotting Sheet, represents the difference between the computed altitude and the observed altitude. The first and second optical means are so related that when the computed altitude of either celestial body is equal to its actual altitude, the image of the celestial body will fall at the point of the assumed position, and when the actual altitude is one degree different from the computed altitude, the image of the celestial body will fall on the azimuth circle on its respective azimuth line image at the point where the azimuth line image intersects the azimuth circle image, and when the actual altitude is between zero and one degree different from the computed altitude, the star image will fall on its respective azimuth line image between the two above mentioned points in accordance with the amount of the difference, in the same manner as for plotting the points for the two stars on a Universal Plotting Sheet. This second optical means comprises two prisms, one for each of the two stars, independently rotatable in azimuth and altitude for training on each of the two stars, and lens and mirror system for forming images of these two stars in the same focal plane as for the real image produced by the first optical means so that the images of the two stars are in the desired composite image.

In addition to the first and second optical means described above, means are also provided for viewing and for photographing the composite image.

My invention will be described and illustrated by reference to the specific embodiment thereof shown in the accompanying drawings in which:

FIG. 1 is a representation of a Universal Plotting Sheet such as published by the Hydrographic Office with a fix of position hand plotted for two stars having azimuth angles of 120° and 220° respectively, with an assumed position of latitude 50° north and longitude 120° west, and, for this example, an actual position of latitude 50°4′ north and longitude 120°46′ west.

FIG. 5 is an elevation cross-sectional view taken through the line V—V of FIG. 3, particularly showing the first optical means which introduces the basic reference markings and azimuth lines into the composite image, and the means for viewing or photographing the composite image.

FIG. 6 is a plan cross-sectional view taken through line

Figure 3:
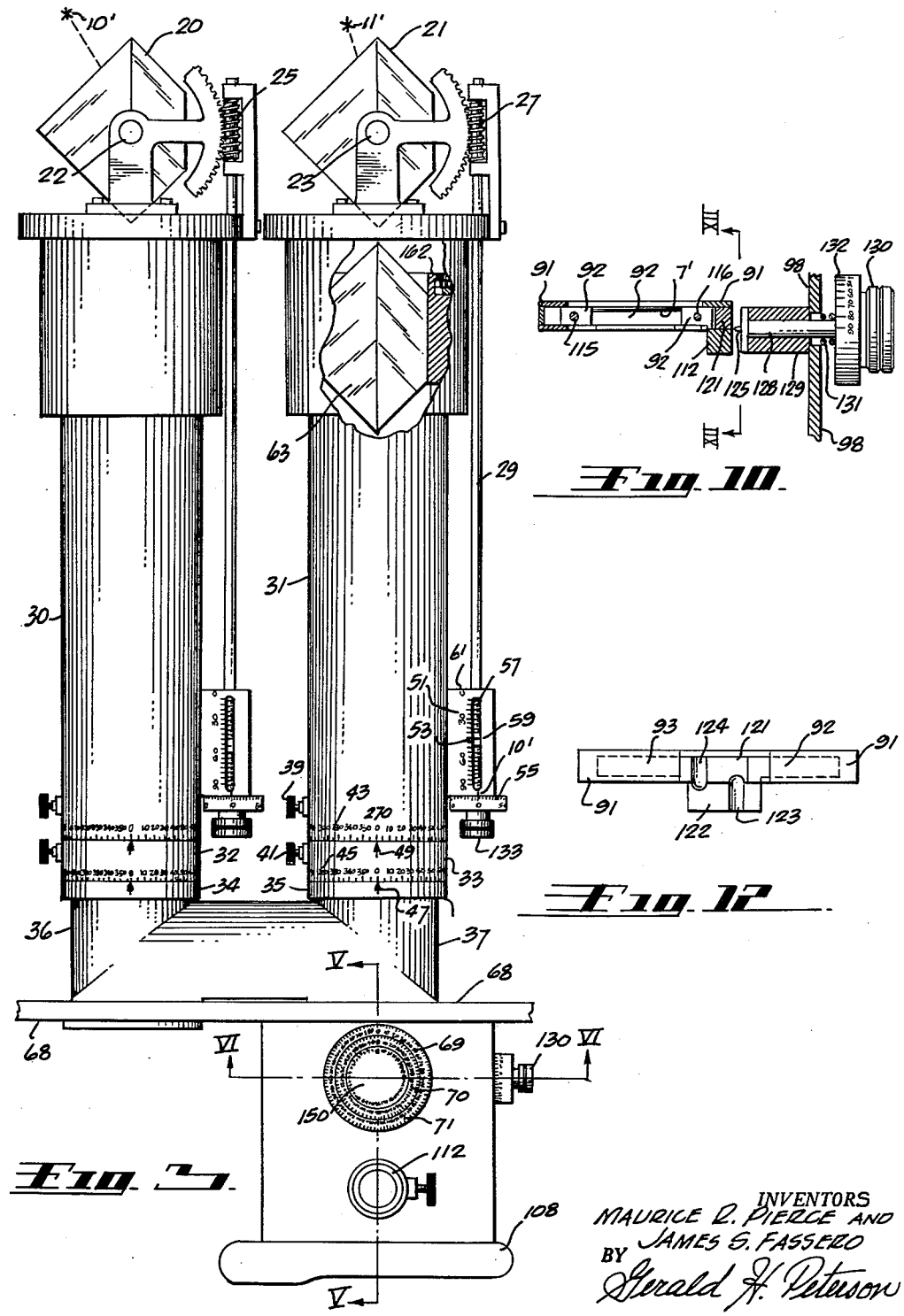
FIG. 3 is an elevation view of the invention, showing the outer appearance and adjustment mechanisms, with the first optical means below a support plate 68 and the second optical means thereabove.

VI—VI of FIG. 3, further showing a cross-section of the optical sources of the first optical means.

FIG. 7 is a detail plan view of the reference circle and azimuth adjusting rings for the first optical means viewed as indicated by line VII—VII in FIG. 5.

FIG. 8 is a cross-section taken through line VIII—VIII of FIG. 7, showing the azimuth adjusting rings and optical sources of the first optical means.

FIG. 9 is an exploded perspective view of the structure disclosed in FIGS. 7 and 8, showing the optical sources of the first optical means.

FIG. 10 is a detailed cross-sectional view of the optical sources of the adjustable longitude lines.

FIG. 11 is a detailed plan view of the optical sources of the adjustable longitude lines shown in the cross section of FIG. 10.

Figure 12:
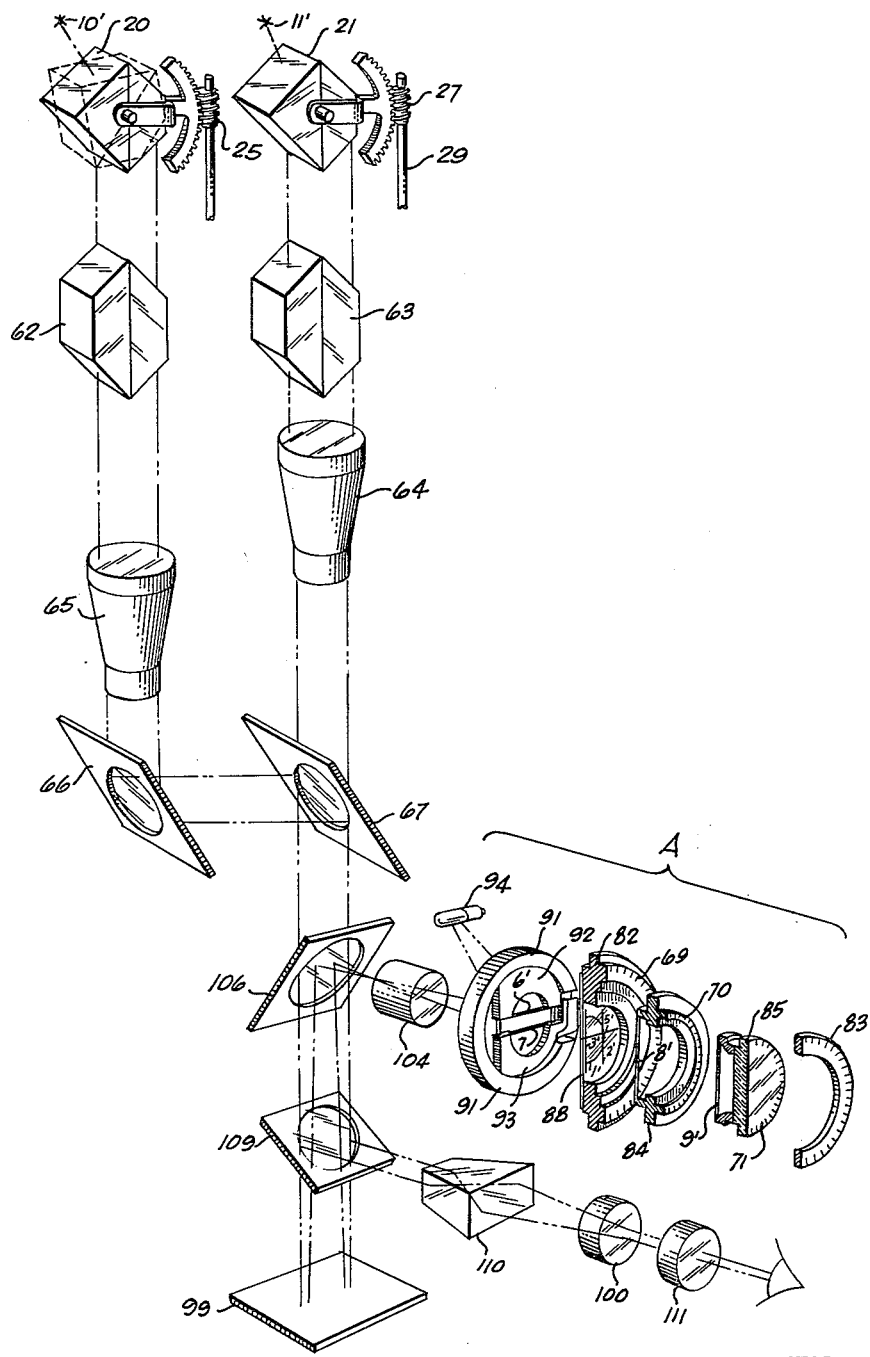

FIG. 12 is a side view of a portion of the longitude line adjusting mechanism taken on the line XII—XII of FIG. 10.

FIG. 13 is a perspective view of the essential optical elements for forming the composite image and adjusting elements of the invention with the sources of the first optical means exploded.

FIG. 14 is a sectional view of one of the two tubes supporting the altitude prisms and associated double Dove prism, with central portion of the tube omitted, showing the relationship of the double Dove prism and the azimuthally rotatable tube.

FIG. 15 is a perspective sectional view of the mechanical arrangement interconnecting the double Dove prism and the tube supporting the altitude prism so that the double Dove prism will rotate half the angle and in the same direction to the altitude prism.

The essential optical elements for this embodiment of the invention are shown in FIG. 13. Within bracket A are shown in exploded perspective the optical elements which constitute the optical sources of the basic reference markings, the two azimuth lines and the two adjustable longitude lines. Thus light reflecting wires 8' and 9' carried by ring 84 and disc 85 respectively, are the optical sources, when illuminated by lamp 94, of the two azimuth lines. Transparent disc 88 in ring 82 carries the basic reference markings as light reflecting lines on the transparent disc, namely, circle 1', longitude line 5', latitude lines 3' and 2', as shown in this FIG. 13. These lines and circle within transparent disc 88 constitute optical sources when also illuminated by lamp 94. Wires 6' and 7' carried by ring 91 are the optical sources of the adjustable longitude lines. These wires 6' and 7' also constitute optical sources when illuminated by lamp 94. It will be understood that rings 91, 82, 84 and disc 85 when fitted together as shown in FIG. 8, wires 6' and 7', transparent disc 88, wire 8' and wire 9' lie as close together as possible so as to be substantially in the same optical plane. The light from azimuth line sources 9' and 8', azimuth circle source 1', latitude and longitude line sources 3' and 5' and latitude line sources 2' and 4' and longitude line sources 6' and 7' is focused by lens 104 to form a real image. The light emerging from lens 104, however, is reflected downwardly by semi-transparent mirror 106 and to the right by mirror 109, when in the position shown in FIG. 13, through reversing prism 110 so that it may be viewed by an eye-piece composed of lenses 100 and 111. Mirror 109 may be moved out from the path between mirror 106 and photographic negative 99 so that the image formed by the lens 104 will be focused on photographic negative 99. This constitutes the first optical means for forming an image of the basic reference markings, two azimuth lines and adjustable longitude lines.

The second optical means is shown in FIG. 13 above semi-transparent mirror 106 for introducing, into the image formed by lens 104, the images of the two stars chosen for observation. Prism 20 is adjusted in azimuth and altitude in accordance with the azimuth and computed altitude for the assumed position of one of the stars and the light from this star passes downwards, preferably through double Dove prism 62 rotatable in azimuth with prism 20 at half the angular rotation thereof and in the same direction, through lens 65, is reflected by mirror 66 and 67 to pass through seim-transparent mirror 106 and by lens 65 is focused in the same optical plane as the image from lens 104 with the star image located in the composite image on the azimuth line and spaced from the center of the azimuth circle in accordance with the differences between the computed and actual altitude, as described above with respect to a hand plot on a Universal Plotting Sheet. In the same manner the image of the other star is introduced into the composite image by prism 21, adjusted with respect to the azimuth and computed altitude for this star, preferably double Dove prism 63 rotatable in azimuth with prism 21 at half the angular rotation thereof and in the same direction, lens 64, semi-transparent mirror 67, and semi-transparent mirror 106. This arrangement constitutes the second optical means referred to above.

Thus by the combination of the first optical means and the second optical means a composite image is produced on photographic negative 99 (with mirror 109 moved out of position as shown at 109' by dotted lines in FIGURE 5).

There is shown in FIGURE 3, below supporting plate 68, the housing for, and the dial that controls, the first optical means for providing to the composite image the basic reference markings, the two azimuth lines and the two adjustable longitude lines. Support plate 68 may be a suitable stabilized platform. Above plate 68 is the second optical means for providing to the composite image the images of the two stars. Below the first optical means is an eye-piece 112 for viewing the composite image and a camera 108 for photographing the composite image.

The first optical means (below plate 68) has external controls generally indicated at 150 for setting the optical sources of the basic reference markings so that the longitude lines extend north and south and latitude lines east and west, setting the two azimuth line sources in accordance with the azimuth of the two stars and control 130 for adjusting the two adjustable longitude lines in accordance with the latitude of the assumed position. The second optical means (above plate 68) has two prisms 20 and 21 mounted at the top of their respective rotating tubes 30 and 31, which tubes can be turned about their vertical axes to direct the prisms in accordance with the azimuth angle of the respective stars. These prisms are also rotatable about horizontal axes to be set in accordance with the computed altitude of the respective stars.

In the use of the invention, the external controls of the first optical means are set to orient the optical sources of the basic reference markings with azimuth circle center, longitude line, and three latitude lines, and adjustable longitude lines so that in the composite image the 0° mark of the circle represents north, the longitude lines extend north and south, and the latitude lines extend east and west; set to turn the two azimuth line sources so the two azimuth line images have the azimuth direction in the composite image on the azimuth circle corresponding to the azimuth direction of their respective stars; and set to adjust the two adjustable longitude line sources in accordance with the latitude of the assumed position. The two prisms are set to the azimuth angle and computed altitude of the two stars. The composite image formed by combining the images from the first optical means with the images of the two stars from the second optical means is viewed through the eye-piece or photographed as desired.

The detailed structure and operation of the first optical means will now be described, particularly with reference to FIGS. 5 through 9. As shown in FIGS. 5 and 6, and also in FIG. 3 below plate 68, the optical sources of the first optical means, the supports therefor and adjusting means therefor are located at the left end of housing 98 as shown in FIG. 5.

Rotatably mounted in a circular opening in housing 98 is ring 82. Holding ring 82 in position, but yet permitting rotation, is ring 97, shown in FIG. 8, which is affixed to housing 98 by screws 81. Rotatable ring 82 carries transparent disc 88, as most clearly shown in FIG. 9, with the light reflecting markings of the basic reference markings comprising latitude line 3', longitudine line 5', azimuth circle 1' and latitude lines 2' and 4'. Transparent disc 88 is affixed to side 82' of ring 82 to cover the central hole of ring 82. Ring 82 fits within groove 98' in the central opening in housing 98. Ring 97 fits within groove 98'' in housing 98. Ring 97 which is affixed to housing 98 carries marker 72 with respect to which central scale 69 of rotatable ring 82 is set to orientate the basic reference markings on transparent disc 88 in the composite image so that, correlated with the images of the stars from the prisms of the first optical means, the longitude lines extend north and south and the latitude lines east and west and so that the 0° marking on the azimuth circle points north. It will be understood that this may be accomplished by directing the device north and south and setting the 0 on scale 69 to mark 72, or by orientating the device fore and aft of the ship or plane and setting the heading on scale 69 opposite marker 72 so that the 0 mark on scale 69 points north. This adjustment is obtained by rotating ring 82 by way of turning knob 78 affixed thereto and is clamped in set position by knob 75, which is tapered at its end 75' to fit into a slit so that a portion of ring 82 expands against housing 98 to fix ring 82 in position.

Ring 84, which carries light reflecting wire 8' as the optical source of one azimuth line, fits rotatably in groove 82' in ring 82 so that wire 8' is very close to the surface of disc 88 and so that the point about which wire 8' is rotatable coincides with the intersection of markings 3' and 5'. Thus ring 84 is rotatable with respect to ring 82 so that wire 8' is rotatable about the center of the azimuth circle marking on disc 88 with respect to azimuth angle which is read on scale 70 carried by ring 84 with respect to the 0 marking of scale 69 of ring 82. That is, for example, a setting of 0 on scale 70 corresponding to 0 on scale 69 would represent an azimuth of due north and a setting of 60 on scale 70 to correspond with the 0 on the scale 69 would correspond with an azimuth of 60°. Ring 84 is rotated by clamping ring 85 thereto by clamp 76 which is tapered at end 76' to fit into a slit in ring 85 so that a portion of ring 85 is pressed against ring 84 to fix the two rings together. Ring 84 is set by moving both rings together to the proper azimuth reading on scale 70 at mark 73.

Ring 85, which carries wire 9', is adapted to fit rotatably within ring 84 with circular disc 85' affixed to ring 85 fitting in groove 84' of ring 84 so that the outer surface of disc 85' is substantially flush with the outer surface of ring 84 carrying scale 70. When clamp 76 is released ring 85 can be rotated independently of ring 84. Ring 85 carries wire 9' and when ring 85 is rotatably fit within ring 84 wire 9' is closely adjacent to wire 8' and, like wire 8', is rotatable about the center of azimuth circle 1' by turning knob 79 which turns disc 85' and ring 85 so that the proper azimuth can be set on scale 71 at mark 74.

Transparent ring 83 is affixed to the surface of ring 82 over scale 69 and extends, as particularly shown in FIGS. 7 and 8, over scale 70 of ring 84 and scale 71 of disc 85'. As shown in FIGS. 7 and 8, transparent disc 83 carries markings 73 and 74 which are angularly aligned with the 0 mark of scale 69 so that azimuth scales 70 and 71 can be readily set with respect to the 0 marking on scale 69, which 0 marking it will be understood to correspond with north.

Ring 91, which carries within it the structure supporting adjustably longitude wires 6' and 7', is affixed to rotatable ring 82 by screws 89 and 90, as shown in FIG. 8, so that wires 6' and 7' are closely adjacent to and parallel to longitude marking 5' on transparent disc 88. Ring 91 rotates with ring 82 so that wires 6' and 7' are always maintained parallel with longitude marking 5'.

Wires 6' and 7', markings 1', 2', 3', 4', and 5', and azimuth wires 8' and 9' are all illuminated by lamp 94, as shown in FIGS. 5 and 13, to provide illuminated optical sources of these respective elements. Lamp 94 is located on door 95 having handle 96 so that the lamp may be conveniently replaced. The visible light from these optical sources is focused by lens 104 and directed to form an image (with mirror 109 in the dotted line position shown in FIG. 5) on photographic negative 99.

The detailed structure of the mechanism for adjusting the two wires 6' and 7', will now be explained in connection with FIGS. 9, 10, and 11, and 12. As shown particularly in FIGS. 8 and 9, carried directly below rotatable circular element or azimuth wheel 82 is circular housing 91, affixed to wheel 82 as by screws 89 and 90. Within housing 91 are two solid elements 92 and 93, each having semi-circular cutouts 113 and 114 within which are wires 6' and 7'. Elements 92 and 93 are slidably mounted to be moved perpendicular to wires 6' and 7' along guide members 115 and 116 extending across circular housing 91 as particularly shown in FIG. 9, FIG. 10, and FIG. 11, and extending through holes 117 and 118 in element 92 and holes 119 and 120 in element 93. Wires 6' and 7' are fixed to the upper part of elements 92 and 93 to fit closely beneath transparent disc 88 to provide sources for the longitude lines 6'' and 7'' in the composite image shown in FIG. 2. The diameter of the semi-circles 113 and 114 as here shown is larger than the diameter of the azimuth circle 1' on transparent disc 88.

Wires 6' and 7' can be adjusted by moving elements 92 and 93 along guides 115 and 116 uniformly from the central position to the maximum separation corresponding to the diameter of the azimuth circle on disc 88. When the two wires 6' and 7' are brought together in the central position, they are substantially coincident and pass through the center of this azimuth circle. This would correspond to a latitude of 90° at the poles. When these wires are uniformly separated the maximum distance, they correspond to the longitude lines at the zero latitude, that is, at the equator. Uniformly separated at any distance therebetween they can be set to provide images of longitude lines 6'' and 7'' for any latitude between zero and 90°.

This setting is accomplished by providing moveable elements 92 and 93 with elements 121 and 122, respectively, carrying vertical grooves 123 and 124, respectively. Adapted to be fit into grooves 123 and 124 are two pins 125 and 126. These are carried on element 127 (FIG. 11) affixed to the end of shaft 128 extending through casing 98, and rotatably held outward by spring 131, and by means of shaft 128, pins 125 and 126 may be pushed into grooves 123 and 124, respectively, and with a turning of knob 130 through 90° elements 92 and 93 and wires 6' and 7' carried thereby may be moved from the position corresponding to zero latitude or 90° latitude, or any latitude position therebetween. With this arrangement the wires 6' and 7' may be adjusted by knob 130 to correspond to any latitude. Knob 130 conveniently carries a scale 132 as seen in FIG. 10, so that the knob may be set in accordance with the latitude in degrees from 0 to 90°. It will be understood that housing 91 and elements 92 and 93 therewithin carrying longitude wires 6' and 7', respectively, is adapted to rotate in a horizontal plane along with and affixed to azimuth wheel 82 carrying plate 88; and that, therefore, in accordance with the arrangement here shown the adjustment of the position of longitude wires 6' and 7' can be made only when azimuth wheel 82 is in the position so that pins 125 and 126 can engage grooves 123 and 124, which as here shown is when the zero degree marking on the azimuth wheel 82 is as shown in FIG. 11.

In operation, the first optical means, the structural parts of which are described above, and shown particularly in FIGS. 5 and 9, is adjusted to set the basic reference markings to correspond with the directions on the earth's surface, the two azimuth lines to correspond with the azimuth angles of the respective two stars chosen for observations, and the adjustable longitude lines in accordance with the latitude of the assumed position. Disc 88 carrying the basic reference markings is adjusted by hand knob 78 so that the 0 marking on scale 69 causes the 0 marking on reference circle image 1' to correctly indicate north and so that longitude line image 5" extends north and south and latitude line image 3" extends east and west. If the instrument is orientated so that arrow marking 72 points north, then this adjustment may be made by setting the 0 marking on scale 69 to correspond with marking 72. If the instrument is orientated so that marking 72 indicates the forward direction of the ship or airplane, for example, then the heading will be set on scale 69 to correspond with marking 72 so that the 0 marking points north and the 0 marking on azimuth circle image 1" represents north with respect to the directions on the earth's surface and the stars on which observations are to be made. It will be understood that the correct directions for the image of the basic reference markings is required so that the images of the stars 10" and 11" will be properly orientated directionally within the basic reference marking images. When scale 69 has been set, ring 82 may be fixed by turning setscrew 75. Ring 84 is turned to coincide with marker 73 on transparent ring 83 so as to set scale 70 at the proper azimuth for one of the stars. Disc 85' is turned to set scale 71 to coincide with marker 74, also carried by transparent ring 83, so as to set scale 71 at the proper azimuth for the other star. Knob 130 is turned to set the two adjustable longitude lines in accordance with the latitude of the assumed position by setting this latitude on scale 132. With all these settings the composite image is provided as shown in FIG. 2 with the exception of stars 10" and 11".

Figure 1:
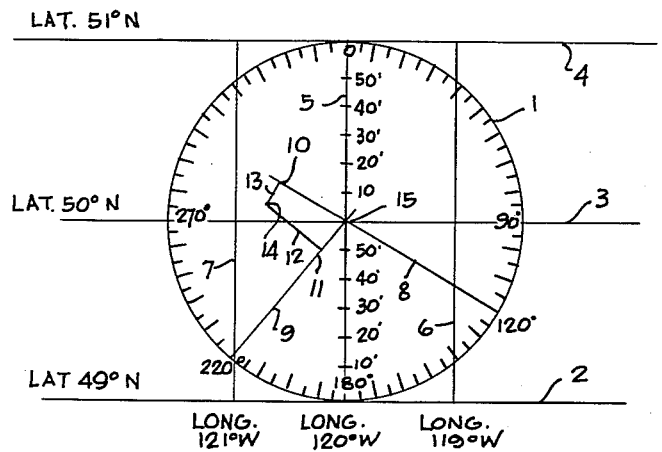
Figure 2:
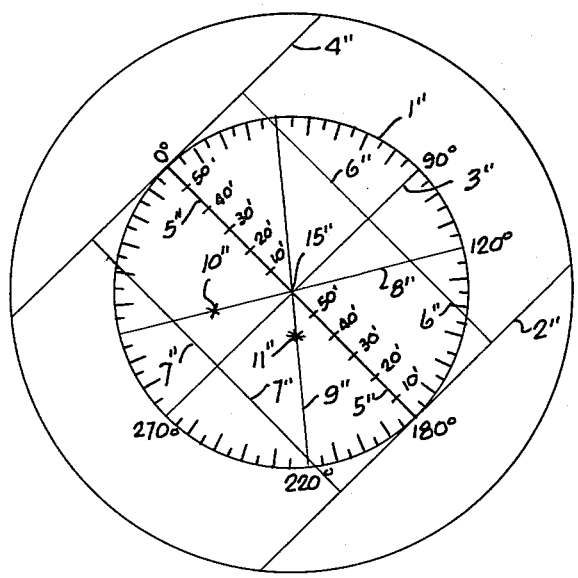
FIG. 2 is a composite image produced by the invention for the same conditions assumed for the hand plot of FIG. 1.

The second optical means provides to the composite image shown in FIG. 2, the images of 10" and 11" in the proper relationship within this composite image as the points for these stars would be plotted on a Universal Plotting Sheet in accordance with the well known procedure in celestial navigation such that 10" falls on azimuth line 8" at a distance from center 15" of azimuth 1" corresponding to the difference between the computed altitude and the observed altitude for one star, and 11" falls on azimuth line 9" at a distance from center 15" corresponding to the difference between the computed and observed altitude for the other star.

Figure 4:
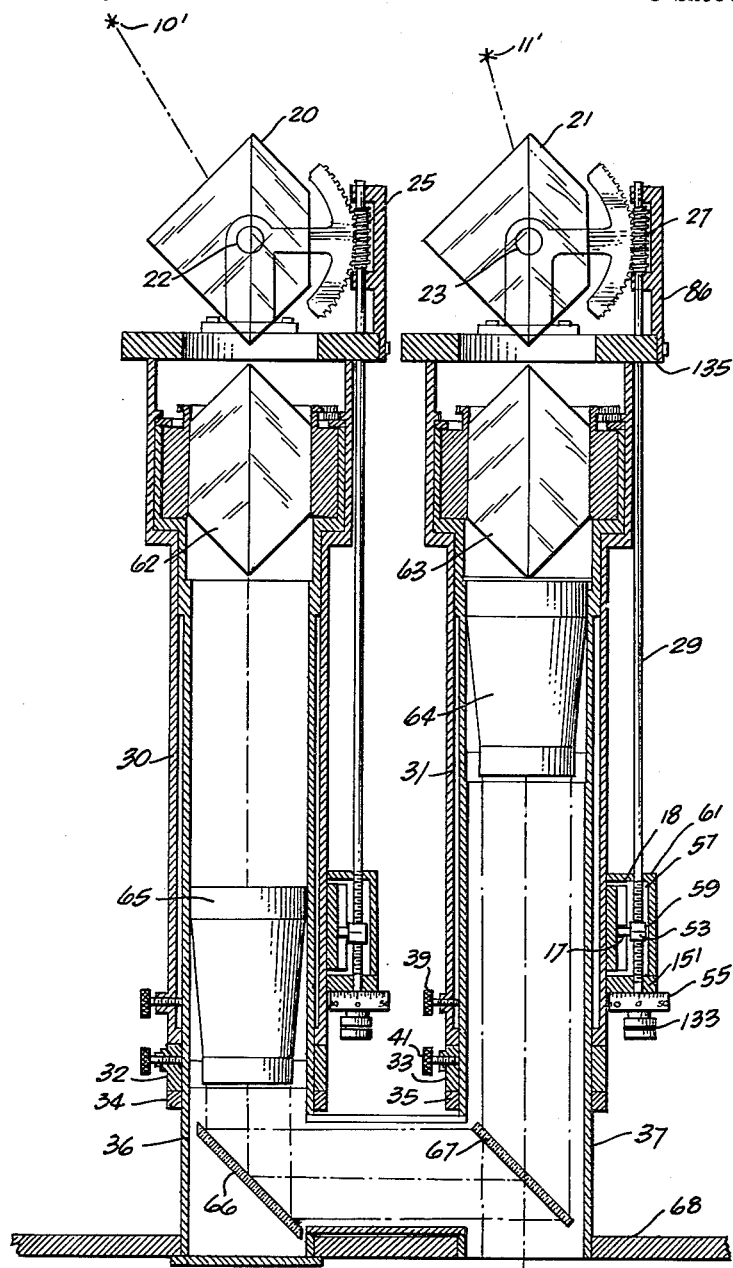
FIG. 4 is an elevation view in cross section taken through the second optical means which introduces the two star images into the composite image.

The detailed structure and operation of the second optical means, which introduces the two star images into the composite image, will be explained particularly in connection with FIGS. 3 and 4. Referring to FIG. 4, light from the two stars 10' and 11' passes first through prisms 20 and 21, which are mounted on rotating tubes 30 and 31. Prisms 20 and 21 are rotatable in elevation angle by their respective worm gear elevation drives 25 and 27. Prisms 20 and 21 are rotatable in azimuth by their respective rotating tubes 30 and 31. By an interconnecting mechanical arrangement, described in detail below, double Dove prisms 62 and 63 are connected to altitude prisms 20 and 21, respectively, through tubes 30 and 31, respectively, and through a gear arrangement so that each double Dove prism rotates half the angle of, and the same direction as, the altitude prism to which it is interconnected. This keeps the field of the star images in the proper position in the image while the altitude prisms are rotated in azimuth. Prisms 20 and 21 can be directed in azimuth to separate stars and adjusted in elevation angle according to the computed altitude of their respective stars for an assumed position.

The operation of setting the prisms to the proper azimuth angle will be described by using prism 21 as an example. Prism 21 and its altitude adjusting mechanism are rigidly connected to outer tubing 31. Outer tubing 31 is rotatably supported by rotating ring 33, which is supported by stationary ring 35. Clamp 41 fixes ring 33 at any desired azimuth position in relation to stationary tube 37. Clamp 39 fixes outer tubing 31 at any desired azimuth in relation to rotating ring 33. Rotating ring 33 has a ship's heading scale 45 around its periphery graduated in degrees from 0° to 360°. Stationary ring 35 has an index marking 47 associated therewith. To direct prism 21 to the azimuth of any chosen star, rotatable ring 33 is first turned until the ship's heading appears above the index 47 on stationary ring 35 so that the azimuth scale 43 for tube 31 will read zero when prism 21 is directed due north. Rotatable ring 33 is then clamped at this heading by clamp 41. Rotatable ring 33 has an index marking 49 which appears directly above 0 on the ship's heading scale 45. After the ship's heading scale 45 has been set to read the ship's heading above index 47, index 49 will then represent the azimuth of north so that when zero of scale 43 is set at index 49 prism 21 points north. It should be understood that the setting of the ship's heading in the invention is only for the purpose of orienting the index 49 so that it reads 0 when the prism points north. It is important that the reading on scale 43 be 0 when the prism is directed north. Rotatable tube 31 is rotated until the chosen star's azimuth appears on scale 43 above index marking 49, and rotatable tube 31 is then clamped in this position by clamp 39. The azimuth setting of star scale 43 above index marking 49, which represents north, then positions prism 21 and its associated altitude adjusting mechanism so that they point in azimuth toward the chosen star. Prism 20 can be set to any desired azimuth angle in the same manner by its corresponding parts: rotatable tube 30, rotatable ring 32, stationary ring 34, and stationary tube 36.

The preferred arrangement for interconnecting the double Dove prism with the altitude prism is shown particularly in FIGS. 14 and 15. As described above, altitude prism 21 is rotated in azimuth by turning tube 31. As shown in FIG. 15, inside of tube 31 are gear teeth 160, which interconnect with gear teeth 162 carried by the support 163 for double Dove prism 63 which rotates within tube 37. Gear teeth 160 are interconnected with gear teeth 162 through a set of three gears 164, 165 and 166 such that movement of gear teeth 160 with rotation of tube 31 causes half the rotation of gear teeth 162 and double Dove prism 63 in the same direction. Reference is made to Wrigley Patent 2,505,819 which shows a double Dove prism rotatable about the same vertical axis as an entrance reflecting prism and the effect this has on the image. This same arrangement is also preferably applied to interconnect altitude prism 20 with double Dove prism 62.

The prism altitude adjusting mechanisms will be described using prism 21 as an example. Referring to FIG. 4, prism 21 is adjustable in altitude from zero to 90° by worm gear 27 which is driven by shaft 29, which can be turned by hand knob 133. Shaft 29 is attached to rotating tube 31 at its upper end by support 86, and at its lower end by support 151. The lower end of shaft 29 is threaded to receive rider 59, which moves up or down when the shaft 29 is turned. Rider 59 is held properly orientated by a groove assembly 18 which receives a tongue 17 attached to the rider. The lower end of shaft 29 is covered by a housing 61.

Referring to FIG. 4, an opening is cut into housing 61 parallel to shaft 29 to expose the position of rider 59. Marked on rider 59 is an index mark 53, which is visible through the opening in housing 61. Marked on housing 61 along the edge of the opening is an altitude angle degree scale 51 graduated in degrees from 0 to 90°. When shaft 29 is turned by hand knob 133 to adjust the altitude setting of prism 21, the rider 59 is moved correspondingly by threads 57, and the position of index 53 in relation to degree scale 51 then indicates the degree setting of the prism 21, that is, the altitude of star 11".

Rigidly attached to the bottom of shaft 29 below housing 61 is a disc on which is marked an altitude minute scale 55 graduated in minutes from 0 to 60. Marked on housing 61 above scale 55 is an index mark 101. The minute reading appearing below index 101 on scale 55 indicates the altitude setting of prism 21 in minutes. Thus to set prism 21 to any desired altitude, hand knob 133 is turned until the desired altitude reading appears on the degree and minute scales opposite their respective indices. Prism 20 can be set to any desired altitude in the same manner by its corresponding parts.

When prisms 20 and 21 are directed in azimuth and altitude toward their respective stars, 10' and 11', the star light passes through prisms 20 and 21, through prisms 62 and 63 and stationary telephoto lenses 65 and 64 to mirrors 66 and 67. Mirror 66 is a totally reflecting mirror which directs the star light from telephoto lens 65 to mirror 67. Mirror 67 is a 50% reflecting mirror, so that star light coming from lens 64 to mirror 67 is passed downward at half intensity. Star light coming from mirror 66 is reflected downward at half intensity. Thus from mirror 67 star light from both stars is transmitted downward through mirror 106 shown in FIG. 13 and is combined with the reference images to form the composite image. The scales of the altitude and azimuth adjustments described for the prisms 20 and 21 is such that the light from the stars will fall in the composite image on their respective azimuth line images at a point proportional to the difference between the star altitude scale setting and the actual star altitude, such that when the difference is zero each star image falls at the center 15" of the reference circle image, and when the difference is 1° each star image falls at the circumference 1" of the reference circle image. For this purpose the lenses 64, 65 and 104 form images having such a relationship and the adjustments for prisms 20 and 21 must be calibrated accordingly.

When the azimuth relationship of the images formed in the first optical means is adjusted to correspond for a fix of position on two specific stars, and with the prisms 20 and 21 set to the star azimuths, the star images 10" and 11" will fall on their respective star azimuth lines 8" and 9" in the composite image, as illustrated in FIG. 2. Furthermore, when prisms 20 and 21 are set in altitude to the computed altitude of their respective stars 10' and 11' for the assumed position, the star images will fall on their respective azimuth lines at a distance from the reference circle center 15" which is determined by the difference between the computed and the actual star altitudes. Therefore, the position of each star image on its respective azimuth line provides directly the point through which a line of position can be drawn perpendicular to the star azimuth line to provide a line of position as understood in celestial navigation, and the intersection of two lines of position drawn through the two star images perpendicular to their respective azimuth lines provides a fix of position as understood in celestial navigation.

We claim:

1. In an optical device, useful in celestial navigation for obtaining a composite representation of an image representing the point of assumed position and the images of two stars simultaneously as plotted on a Universal Plotting Sheet in celestial navigation for the purpose of obtaining a fix, comprising a first optical means forming a first optical path and providing an image of a first star in a focal plane, the entrance optical aperture of said first optical means being adjustable with respect to the altitude and azimuth of said star, a second means for forming an optical image of the point representing the assumed position and introducing said image into said first optical path and thereby providing in said focal plane an image of a point representing the assumed position, and a third optical means forming a second optical path and introducing an image of a second star into said first focal plane simultaneously with the image of said first star, the entrance optical aperture of said third optical means being adjustable with respect to the altitude and azimuth of said second star, said first, second and third means being structurally related in such a way that said image of the point representing the assumed position, the image of said first star, and the image of said second star appear in said focal plane as plotted on a Universal Plotting Sheet with each of said star images spaced from the point of assumed position a distance representing the difference between the altitude for each star calculated for the assumed position and the observed altitude for each star, and a line from one star image through the point of assumed position corresponds with the azimuth of said star and a line from the other star image through the point of assumed position corresponds with the azimuth of said other star.

2. An optical device as defined in claim 1 in which said first means comprises a first optical means adjustable in altitude and azimuth for alignment on said first star in accordance with its azimuth and its altitude calculated for the assumed position and a second optical means associated with said first optical means to form the image of said first star in a first focal plane, and said third means comprises a first optical means adjustable in altitude and azimuth for alignment on said second star in accordance with its azimuth and its altitude calculated for the assumed position, a second optical means associated with said first optical means for forming the image of said second star in a second focal plane, and means for combining said second focal plane with said first focal plane so that the images of said two stars appear in the same focal plane.

3. An optical device as defined in claim 1 in which said first means comprises an optical means adjustable in altitude and azimuth for alignment on said first star in accordance with its azimuth and its altitude calculated for the assumed position and a lens associated with said optical means to form the image of said first star in a first focal plane, and said third means comprises an optical means adjustable in altitude and azimuth for alignment on said second star in accordance with its azimuth and its altitude calculated for the assumed position, a lens associated with said optical means for forming the image of said second star in a second focal plane, and means for combining said second focal plane with said first focal plane so that the images of said two stars appear in the same focal plane.

4. An optical device as defined in claim 3 in which said means for combining said second focal plane with said first focal plane comprises a light transmitting and reflecting mirror in the path of the light from said first mentioned lens and a reflecting mirror in the path of the light from said second mentioned lens directing said light toward said reflecting and transmitting mirror.

5. An optical device as defined in claim 1 in which said first means comprises a prism adjustable in altitude and azimuth for alignment on said first star in accordance with its azimuth and its altitude calculated for the assumed position and a lens associated with said prism to form the image of said first star in a first focal plane, and said third means comprises a prism adjustable in altitude and azimuth for alignment on said second star in accordance with its azimuth and its altitude calculated for the assumed position, a lens associated with said prism to form the image of said second star in a second focal plane, and means for combining said second focal plane with said first focal plane so that the images of said two stars appear in the same focal plane.

6. An optical device as defined in claim 1 in which said second means includes independent means providing optical sources of two azimuth lines in said focal plane which by means of said lens provide in said composite image, images of an azimuth line for each of said two stars passing through the image of each star and the image of the point representing the assumed position.

7. An optical device as defined in claim 6 in which said independent means for providing said azimuth lines are rotatable about the means providing for the point of assumed position in said focal plane so that said azimuth lines are adjustable in accordance with the azimuth of the respective stars.

8. An optical device as defined in claim 1 in which said first means comprises a first optical means adjustable in altitude and azimuth for alignment on said first star in accordance with its azimuth and its altitude calculated for the assumed position and second optical means associated with said first optical means to form the image of said first star in a first focal plane, said second means comprises an optical source for said basic reference markings, an optical means for forming an image thereof in a second focal plane, and means for combining said second focal plane with said first focal plane so that the images of said first star and said basic reference markings appear in the same focal plane, and said third means comprises a first optical means adjustable in altitude and azimuth for alignment on said second star in accordance with its azimuth and its altitude calculated for the assumed position, a second optical means associated with said first optical means for forming the image of said second star in a third focal plane, and means for combining said third focal plane with said first focal plane so that the images of said two stars and the image of said basic reference markings appear in the same focal plane.

9. An optical device as defined in claim 1 in which said first means comprises a first optical means adjustable in altitude and azimuth for alignment on said first star in accordance with its azimuth and its altitude calculated for the assumed position and a lens associated with said first optical means to form the image of said first star in a first focal plane, said second means comprises an optical source for said basic reference markings, a lens for forming an image thereof in a second focal plane, and means for combining said second focal plane with said first focal plane so that the images of said first star and said basic reference markings appear in the same focal plane, and said third means comprises a first optical means adjustable in altitude and azimuth for alignment on said second star in accordance with its azimuth and its altitude calculated for the assumed position, a lens associated with said first optical means for forming the image of said second star in a third focal plane, and means for combining said third focal plane with said first focal plane so that the images of said two stars and the image of said basic reference markings appear in the same focal plane.

10. An optical device as defined in claim 9 in which said means for combining said second focal plane with said first focal plane comprises a light transmitting and reflecting mirror in the path of the light from said first mentioned lens and a reflecting mirror in the path of the light from said second mentioned lens directing said light toward said reflecting and transmitting mirror, and said means for combining said third focal plane with said first focal plane comprises a light transmitting and reflecting mirror in the path of the light from said first mentioned light transmitting and reflecting mirror and in the path of the light from said second mentioned lens.

11. An optical device as defined in claim 1 in which said first means comprises a prism adjustable in altitude and azimuth for alignment on said first star in accordance with its azimuth and its altitude calculated for the assumed position and a lens associated with said prism to form the image of asid first star in a first focal plane, said second means comprises an optical source for said basic reference markings, a lens for forming an image thereof in a second focal plane, and means for combining said second focal plane with said first focal plane so that the images of said first star and said basic reference markings appear in the same focal plane, and said third means comprises a prism adjustable in altitude and azimuth for alignment on said second star in accordance with its azimuth and its altitude calculated for the assumed position, a lens associated with said prism for forming the image of said second star in a third focal plane, and means for combining said third focal plane with said first focal plane so that the images of said two stars and the image of said basic reference markings appear in the same focal plane.

12. An optical device as defined in claim 1 in which said second means comprises an optical source of said basic reference markings and an optical means producing an image thereof in said focal plane, and in which said second means has associated therewith independent means providing optical sources of two adjustable longitude lines which by means of said lens provide in said composite image, images of two longitude lines adjustable in spacing in accordance with the latitude of the assumed position.

13. An optical device as defined in claim 1 in which said second means comprises an optical source of said basic reference markings and an optical means producing an image thereof in said focal plane, said basic reference markings including a point representing the assumed position latitude and longitude lines intersecting at said point, an azimuth circle with center at said point having a radius corresponding to one degree of latitude, two latitude lines at the points where said longitude line intersects said circle, and in which said second means has associated therewith independent means providing optical sources of two adjustable longitude lines which by means of said lens provide in said composite image, images of two longitude lines adjustable in spacing in accordance with the latitude of the assumed position.

14. An optical device as defined in claim 1 in which said second means comprises an optical source of said basic reference markings and an optical means producing an image thereof in said focal plane, said basic reference markings including a point representing the assumed position latitude and longitude lines intersecting at said point, an azimuth circle with center at said point having a radius corresponding to one degree of latitude, two latitude lines at the points where said longitude line intersects said circle, and in which said second means has associated therewith independent means providing optical sources of two adjustable longitude lines which by means of said lens provide in said composite image, images of two longitude lines adjustable in spacing in accordance with the latitude of the assumed position and independent means providing optical sources of two azimuth lines which by means of said lens provide in said composite image, images of an azimuth line for each of said two stars passing through the image of each star and the image of the point representing the assumed position.

15. In an optical device, useful in celestial navigation for obtaining a composite of an indication representing the point of assumed position and the images of two stars simultaneously as plotted on a Universal Plotting Sheet in celestial navigation for the purpose of obtaining a fix, comprising a first optical means forming a first optical path and providing an image of a first star in a focal plane, the entrance optical aperture of said first optical means being adjustable with respect to the altitude and azimuth of said star, a second means providing an indication of the point of assumed position in said focal plane, and a third optical means forming a second optical path and introducing an image of a second star into said first optical path and thereby providing an image of a second star in said focal plane simultaneously with the image of said first star, the entrance optical aperture of said third optical means being adjustable with respect to the altitude and azimuth of said second star, said first, second and third means being structurally related in such a way that said indication of the point representing the assumed position, the image of said first star, and the image of said second star appear in said focal plane as plotted on a Universal Plotting Sheet with each of said star images spaced from the indication of the point of assumed position a distance representing the difference between the altitude for each star calculated for the assumed position and the observed altitude for each star, and a line from one star image through the indication of the point of assumed position corresponds with the azimuth of said star and a line from the other star image through the indication of the point of assumed position corresponds with the azimuth of said other star.

16. In an optical device as defined in claim 1 in which said first and third optical means comprise a reflecting prism rotatable about a horizontal axis and adjustable with respect to altitude, each of said prisms being also rotatable about a vertical axis and means in the optical path from each prism maintaining the field of the star images in the proper position in said composite image as said prisms are rotated in azimuth about said vertical axis.

17. In an optical device as defined in claim 16 in which said means in the optical path from each prism is a double Dove prism, and means interconnecting each double Dove prism with each altitude prism so that each double Dove prism rotates half the azimuthal angle of the altitude prism and in the opposite direction.

18. In an optical device as defined in claim 1 in which said first and third optical means comprise a periscope having as the optical entrance aperture a reflecting element rotatable about the horizontal axis and a means for observing the image in said reflecting element, and in the optical path between said reflecting element and said means for observing said image a means maintaining the field of view in the proper position as said reflecting element is rotated in azimuth about said vertical axis.

References Cited in the file of this patent

UNITED STATES PATENTS

| | | |
|---|---|---|
| 886,722 | Neumayer | May 5, 1908 |
| 1,160,184 | Mackensen | Nov. 16, 1915 |
| 2,064,062 | Hagner | Dec. 15, 1936 |
| 2,471,686 | Hiltner | May 31, 1949 |
| 2,505,819 | Wrigley | May 2, 1950 |
| 2,688,896 | Tripp | Sept. 14, 1954 |
| 2,930,545 | Houle et al. | Mar. 29, 1960 |

FOREIGN PATENTS

| | | |
|---|---|---|
| 840,326 | France | Jan. 16, 1939 |
| 610,561 | Great Britain | Oct. 18, 1948 |